United States Patent [19]
Legille et al.

[11] 4,290,067
[45] Sep. 15, 1981

[54] RADIANT ENERGY PROFILOMETER

[75] Inventors: Edouard Legille; Victor Kremer, both of Luxembourg, Luxembourg

[73] Assignee: Paul Wurth, S.A., Luxembourg, Luxembourg

[21] Appl. No.: 102,428

[22] Filed: Dec. 10, 1979

[30] Foreign Application Priority Data

Dec. 12, 1978 [LU]  Luxembourg ............................ 80645

[51] Int. Cl.³ ............................................. G01S 13/08
[52] U.S. Cl. ................................ 343/12 R; 73/290 R; 266/92; 266/94; 414/148
[58] Field of Search ............... 73/290 R; 266/92, 94; 414/148; 343/12 R

[56] References Cited
U.S. PATENT DOCUMENTS

| | | | |
|---|---|---|---|
| 3,289,303 | 12/1966 | Farrell et al. | 73/290 R X |
| 3,693,812 | 9/1972 | Mahr et al. | 414/148 |
| 3,905,239 | 9/1975 | Legille | 73/291 X |
| 4,044,354 | 8/1977 | Bosher et al. | 343/14 |
| 4,044,355 | 8/1977 | Edvardsson | 343/14 |
| 4,050,592 | 9/1977 | Greaves et al. | 414/148 |
| 4,094,494 | 6/1978 | Mahr | 266/92 X |
| 4,219,814 | 8/1980 | Johnson | 343/12 R X |

Primary Examiner—Malcolm F. Hubler
Attorney, Agent, or Firm—Fishman and Van Kirk

[57] ABSTRACT

A non-contacting surface contour measurement device includes movable member which can selectively be actuated to form a hermetic enclosure about a transmit and/or receive antenna. The measurement device, when employed in a blast furnace, need be exposed to the furnace environment only during measuring modes which constitute a small portion of the furnace operating cycle.

23 Claims, 8 Drawing Figures

RADIANT ENERGY PROFILOMETER

BACKGROUND OF THE INVENTION (1) Field of the Invention

The present invention relates to measuring the contour of a surface from a position located remotely from that surface and particularly to determining the profile of the surface of charge material which has been deposited on the hearth of a furnace. More specifically, this invention is directed to apparatus which employs a beam of energy, particularly electromagnetic energy, to determine the profile of the surface of the burden in a shaft furnace. Accordingly, the general objects of the present invention are to provide novel and improved methods and apparatus of such character.

(2) Description of the Prior Art

It is well known that proper exercise and control over the profile of the charge on the hearth of a blast furnace is essential to maximizing the efficiency of operation of the furnace. Obviously, in order to control charge profile, means must be provided for determining the contour of the surface of the charge at least on a periodic basis during the furnace charging operation. Devices for making such measurements are known in the art as profilometers. The prior art profilometers may be classified generally as either being of the mechanical probe type or the radiant energy type. The early mechanical probe type profilometers were capable of making a measurement at only a single point. Improved mechanical probe type profilometers enable the shifting of that single point of contact with the surface of the charge. This shifting of the measuring point, however, is accompanied by mechanical complexity and, for sufficient information to be collected so as to enable the charge profile to be determined, a large number of individual measurements are required thus making the task of determining the charge profile a time consuming endeavor. Examples of mechanical probe type profilometers of modern design may be found in U.S. Pat. Nos. 3,905,239 and 4,094,494. The profilometer of U.S. Pat. No. 4,094,494 is designed for use with a furnace charging installation of the type which is known in the art as a "bell-less top" or a "coneless throat." Such a charging installation is shown and described in U.S. Pat. No. 3,693,812 and has the advantage of allowing exercise of a high degree of control over the charge profile when sufficient surface contour information is available.

Profilometers of the radiant energy type may be based upon radar technology and include means for transmitting electromagnetic energy to the charge surface and receiving energy reflected from the charge surface. A radar type probe is described in Luxembourg Pat. No. 70310. The profilometers which employ a beam of radiant energy constitute a technical advance over mechanical probes since they provide the requisite surface contour information rapidly and are particularly suitable for automatic control. This automatic control may, for example, result in the profile of the charging surface being measured on a periodic basis such as, for example, each time a layer of material has been deposited on the furnace hearth. Alternatively, the surface contour may automatically, with a radiant energy type profilometer, be measured in accordance with a predetermined program. In either case, the information derived by the profilometer may be employed to control the motion of the charge distribution chute of a furnace charging installation of the type shown in U.S. Pat. No. 3,693,812.

Profilometers of the radiant energy type, and particularly those which operate on the principle of radar, offer theoretical advantages when compared to profilometers of the mechanical probe type. However, because of the existence of a number of inherent problems, radar profilometers have not previously gained acceptance for use in commercial installations.

One of the problems alluded to above resides in the necessity of providing for the removal of the portions of the profilometer which are installed in the furnace, for maintenance by way of example, without impeding the operation of the furnace. In this regard, it should be noted that modern blast furnaces operate with high pressures and thus the problem of providing a hermetic seal is greatly complicated. The problem being discussed is further complicated by the fact that the beam of energy emitted from the probe must be caused to scan the surface of the charge on the furnace hearth, at least along a line, and this is accomplished by imparting motion to the antenna which transmits the energy and receives reflections from the surface of interest. The antenna will typically be of the parabolic type and, in order to permit passage of the antenna and the means by which it is scanned, the opening required in the furnace wall must be comparatively large. The problem thus becomes one of transmitting motion through the furnace wall, or an extension thereof which houses the antenna, without leakage of the pressurized furnace gases and without requiring shut-down of the furnace.

A second problem resides in maintaining the probe in operating condition. The conditions within the furnace constitute an exceedingly harsh operating environment and, during the charging process, the furnace atmosphere become laden with particulate matter. As a result, a deposit of dust rapidly forms on the parabolic reflector of the radar probe and, after but a few days of exposure to the furnace environment, the probe will become inoperable.

SUMMARY OF THE INVENTION

The present invention overcomes the above briefly discussed and other deficiencies and disadvantages of the prior art by providing a novel and improved method of and apparatus for transmitting radiant energy to the surface of the charge material on the hearth of a furnace and receiving energy reflected from the charge surface. Apparatus in accordance with the present invention serves the dual purposes of selectively hermetically isolating the transmitting-receiving device from the interior of a furnace so as to permit maintenance operations and of keeping the device sufficiently clean so as to enable it to function correctly for a reasonable period of time.

The aforementioned apparatus in accordance with the present invention comprises a device for mounting a probe, the parabolic antenna of a radar transceiver for example, so that it can alternately be exposed to the environment existing within the furnace and hermetically isolated from such environment. The mounting device includes a member which is movable between a first position, corresponding to the operation of the probe, and a second position wherein the movable member in part forms a hermetically sealed enclosure about the probe whereby the probe is isolated from the interior of the furnace. This movable member is operated by a control mechanism which is preferably situated to the exterior of the furnace.

Apparatus in accordance with the present invention may also include means for establishing a flow of gas relative to the probe, particularly a parabolic antenna, at least during the period of operation thereof to minimize the possibility of particulate material being deposited on the active surfaces of the antenna.

In accordance with a first embodiment of the invention, the probe is mounted for oscillatory motion within a fixed housing, which may in part be defined by the furnace wall, and a chamber defining member is mounted for reciprocal motion within the housing along the axis about which the probe may be rotated. The chamber defining member may thus be moved to a retracted position, to operate the probe, or a forward position where it is pressed against the wall of the housing to form a hermetic enclosure about the probe. In accordance with this first embodiment, the probe can be dismantled and removed from the furnace by means of an aperture in the furnace wall which will lie within the base of the hermetic enclosure formed by the chamber defining means.

In the above described first embodiment, and modifications thereof, the chamber defining member may be mounted on the piston rod of a pneumatic or hydraulically actuated jack and the cylinder of the jack may be mounted to the exterior of the housing and/or furnace. As an alternative, the chamber defining member may itself be integral with the piston of the jack.

In accordance with a second embodiment of the invention, the probe is mounted within a chamber defining member which rotates with the probe during a scanning operation; the beam of electromagnetic or other energy radiated from the probe passing through an opening in the rotatable member. In order to hermetically isolate the probe from the furnace interior, the member is rotated to face a reciprocal cover defining member which is then urged into sealing relationship with the housing about the periphery of the opening therein. In the second embodiment, motion of the cover member is produced by means of a hydraulic or pneumatic actuator located to the exterior of the furnace.

BRIEF DESCRIPTION OF THE DRAWING

The present invention may be better understood and its numerous objects and advantages will become apparent to those skilled in the art by reference to the accompanying drawing wherein like reference numerals refer to like elements in the several FIGURES and in which.

DESCRIPTION OF THE PREFERRED EMBODIMENT

Figure 1:
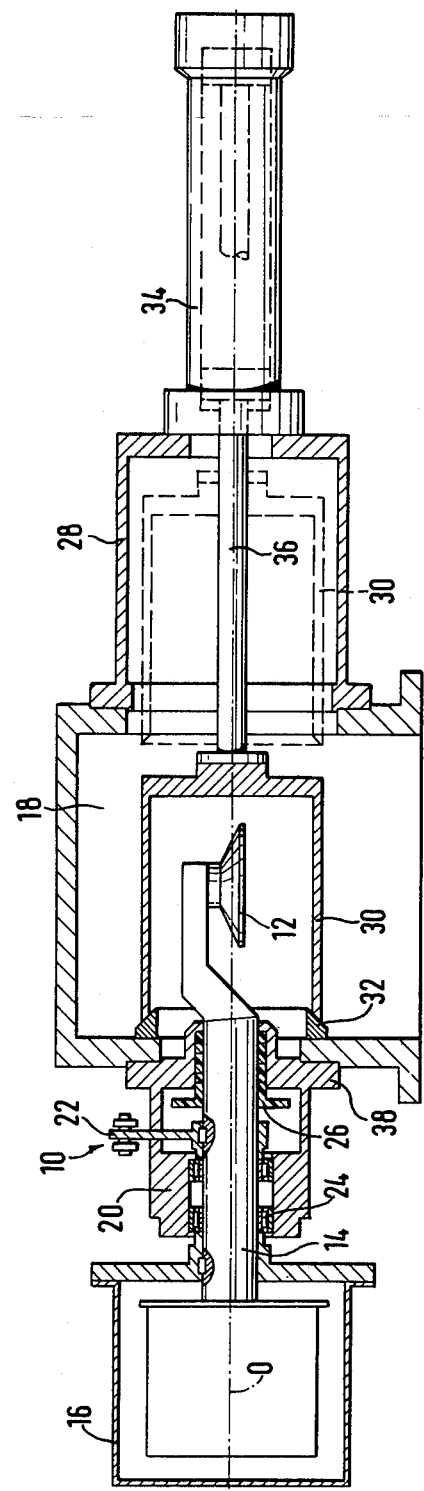
FIG. 1 is a schematic side elevation view, partly in section, of apparatus in accordance with a first embodiment of the present invention.

Referring now to the drawing, and particularly to FIG. 1, a profilometer which operates on the principles of radar is indicated generally at 10. The profilometer 10 is of the type described in aforementioned Luxembourg Pat. No. 70310. Profilometer 10 comprises an antenna 12 which is positioned for use within a housing 18. Antenna 12 and the signal transmitting apparatus associated therewith may be considered a radiant energy probe. Housing 18 may be actually formed in, and thus comprise part of, a wall of a shaft furnace. The details of the furnace have been omitted from the drawing in the interest of facilitating understanding of the present invention. The profilometer 10 is supported in a mounting block 20 which is affixed to a lateral wall of housing 18. The antenna 12 is connected via a shaft 14 to a further housing 16, located to the exterior of the furnace, which contains the electronics of the profilometer; the electronics generating the RF energy and converting and processing signals commensurate with reflected energy received by antenna 12. The antenna 12 will typically comprise a parabolic reflector which is coupled to the electronics in housing 16 via wave guides; the signal transmission path between the electronics and antenna 12 terminating at the focal point of the parabolic reflector in the manner known in the art.

The housing 18 will be provided with an opening at one side thereof as shown. The electromagnetic energy, which is radiated from antenna 12 in the form of a focused beam, will pass through the opening in housing 18. In order to scan this beam over the surface of interest, whereby the time of the receipt of reflections from the surface will be indicative of surface contour, a driving device will cause rotation of shaft 14 about axis O. The driving device, not shown, will be coupled to a connecting rod 22 and the beam of RF energy will preferably be scanned along a diameter of the charging surface. The rotation of shaft 14 is permitted through supporting the shaft in mounting block 20 by means of bearings 24. Leakage of gas from the furnace about the periphery of shaft 14 is prevented by means of a stuffing box 26 which forms a rotary seal.

In accordance with one of the features of a preferred embodiment of the present invention, the electronics associated with antenna 12 is mounted for oscillation with shaft 14 and the antenna during the scanning operation. By making the housing 16 for the electronics integral with the shaft 14 and antenna 12, the wave guides which couple signals between the antenna and the electronics can be rigid components which will not be distorted by the oscillation of the antenna.

A further important feature of the present invention is the provision of a chamber defining member 30 which, in the FIG. 1 embodiment, is of generally cylindrical shape. The chamber defining member, which may be considered a sealing bell, is movable between the position illustrated in full lines, in which it is pressed hermetically onto an annular seat 32 which is coaxial with shaft 14, and the position illustrated in broken lines, wherein it is positioned within an extension 28 of housing 18. The reciprocating motion of member 30 between the two positions depicted in FIG. 1 is produced by means of a jack 34 which is affixed to the exterior of the housing extension 28. A piston rod 36 extends from jack 34 and is directly connected to member 30. Jack 34 may be either a pneumatic or hydraulic actuator with a pneumatic actuator being preferred in the interest of eliminating the possibility of hydraulic fluid leakage into housing 18.

During a scanning operation, when pulses of RF energy are being transmitted from antenna 12 to the surface of the charge on the furnace hearth and reflected energy is being received at antenna 12, the chamber defining device 30 will occupy the position illustrated in broken lines. As soon as the scanning is completed, and the rotation of shaft 14 terminated, the chamber defining device 30 will be actuated to the position in which it is shown in FIG. 1 whereby antenna 12 will be hermetically isolated from the interior of the furnace.

Figure 2:
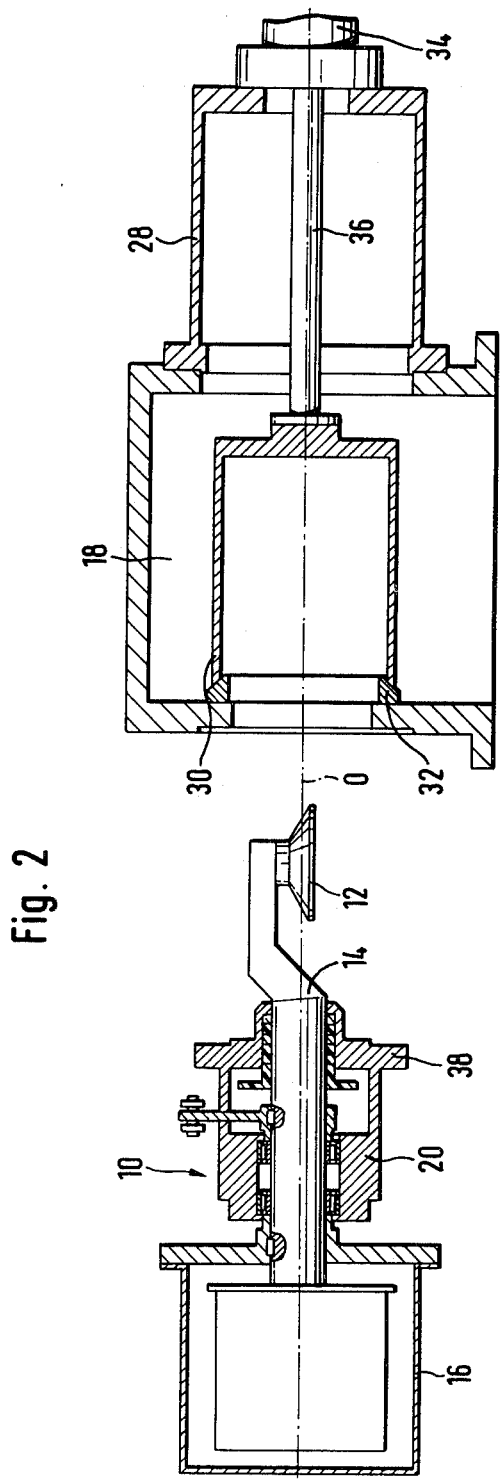
FIG. 2 is a view of the apparatus of FIG. 1 with the probe dismantled.

With the chamber defining device in position to hermetically isolate the antenna 12 from the furnace interior, the profilometer 10 may be dismantled as shown in FIG. 2. The dismantling may be accomplished by releasing a securing device, not shown, which holds the flange 38 of mounting block 20 against the wall of housing 18. It will be understood that this wall will comprise part of the furnace wall. As indicated in FIG. 2, in the embodiment of the invention which is being described, the probe may be removed as a complete unitary assembly which includes the antenna and the electronics. Since the opening left in the wall of chamber 18 by the removal of probe 10 is hermetically sealed by the interaction between seat 32 and a peripheral portion of member 30, the dismantling of probe 10 for any necessary maintenance will not interfere with furnace operation and, of course, a complete substitute probe assembly may be inserted while the device which has been removed is taken to a service facility as a complete unit.

Figure 3:
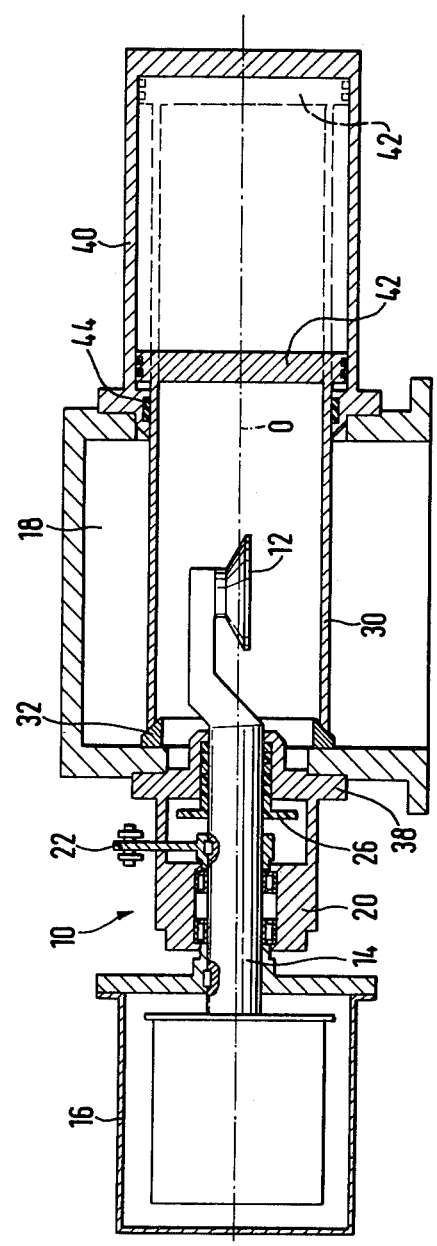
FIG. 3 is a schematic side elevation view, partly in section, of a second embodiment of the present invention.

Referring now to FIG. 3, a second embodiment of the present invention is disclosed. The embodiment of FIG. 3 is similar to that of FIG. 1 and will typically be employed where space limitations would weigh against use of the FIG. 1 embodiment. In FIG. 3 the actuator for controlling the movements of the chamber defining member 30 is mounted directly to a sidewall of housing 18 rather than being mounted on an extension thereof. In the FIG. 3 embodiment the cylinder of the actuator is indicated at 40 and the actuator piston 42 defines an end of the chamber defining member 30. The actuator of the FIG. 3 embodiment is preferably a pneumatic device wherein a pressurized gas causes movement of piston 42. A sliding seal 44 will isolate the interior of the cylinder 40 from the interior of housing 18.

In the embodiment of the present invention represented in FIG. 4, the hermetic enclosure for antenna 12 is, in the manner to be described below, defined by a first member 130 and a second member 140. As in the case of the chamber defining member 30 of the FIG. 1 embodiment, members 130 and 140 are positioned within a housing; the housing being indicated at 118 in FIG. 4. In the FIG. 4 embodiment the antenna 12 is supported on the end of a shaft 114 which will include the waveguides for coupling the antenna to the electronics in housing 16. The housing 16 and shaft 114 are hermetically coupled to the above mentioned member 130 by means of a flange 138. Antenna 12 is thus positioned within the aforementioned member 130 in registration with a "window" 131 through which the RF energy is transmitted. Member 130 is provided, at the side opposite to flange 138, with a shaft extension and is supported for rotation in the housing 118 by means of bearings 116 and 120. Rotary seals 122 and 124, which may, for example, comprise stuffing boxes, prevent the leakage of furnace gases from the interior of housing 118 about member 130.

Figure 4:
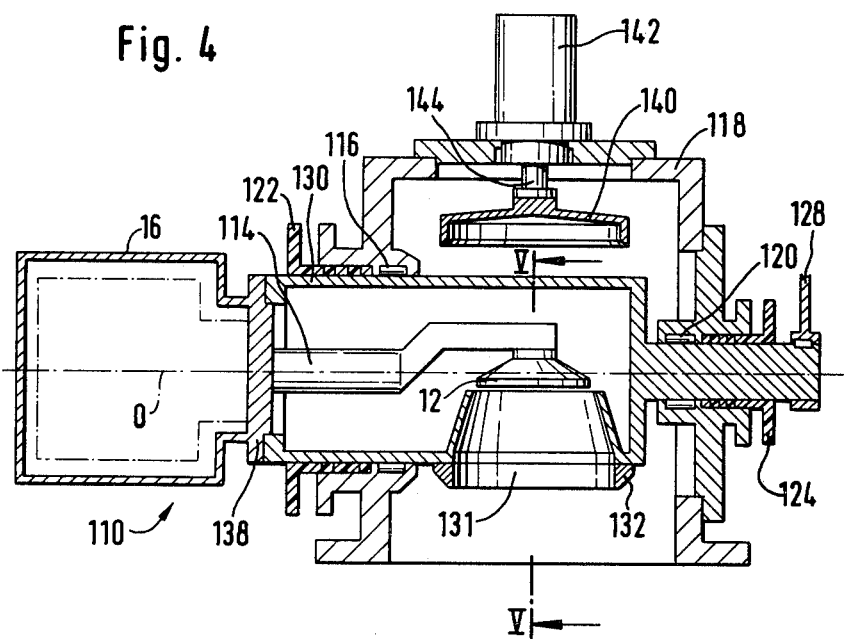
FIG. 4 is a schematic side elevation view, partly in section, of a third embodiment of the present invention.

In the FIG. 4 embodiment, the scanning of the beam of energy across the surface of the furnace charge is accomplished by imparting rotary motion to member 130 by means of a connecting rod 128 which is preferably driven by an electric motor, not shown. Accordingly, as in the FIG. 1 embodiment, the antenna 12 will be scanned about axis O and the housing 16 containing the electronics will rotate with the antenna.

FIG. 4 depicts the apparatus in the scanning condition wherein the antenna 12 is exposed to the interior of the furnace. When a surface charge profile measurement has been completed, and it is thus then desirable to isolate antenna 12 from the furnace atmosphere, the member 130 is rotated so that it faces the member 140. Member 140 functions as a cover to seal the "window" or aperture 131 in member 130 by cooperation with a seat 132 provided about the periphery of aperture 131. Accordingly, when the member 130 has been rotated to the position shown in FIG. 6, the cover member 140 will be moved so as to urge a peripheral flange portion thereof against the seat 132. The reciprocating movements of cover member 140 are accomplished through the use of a fluidic actuator which has its cylinder 142 positioned to the exterior of housing 118. The piston within actuator 142 is connected to the cover member 140 by means of a piston rod 144 which passes through the wall of chamber 118. To insure a satisfactory closure of aperture 131, the cover member 140 may be articulated to piston rod 144 to insure an accurate fit between the flange on cover member 140 to the seal 132. With the cover member actuated to the position depicted in FIG. 6, the rotatable member 130 and the cover 140 will define a chamber for antenna 12 and this chamber will be hermetically isolated from the furnace interior.

Figure 5:
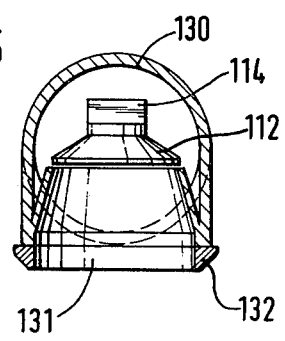
FIG. 5 is a cross-sectional view, taken along line V—V of FIG. 4, of the apparatus of FIG. 4.
Figure 6:
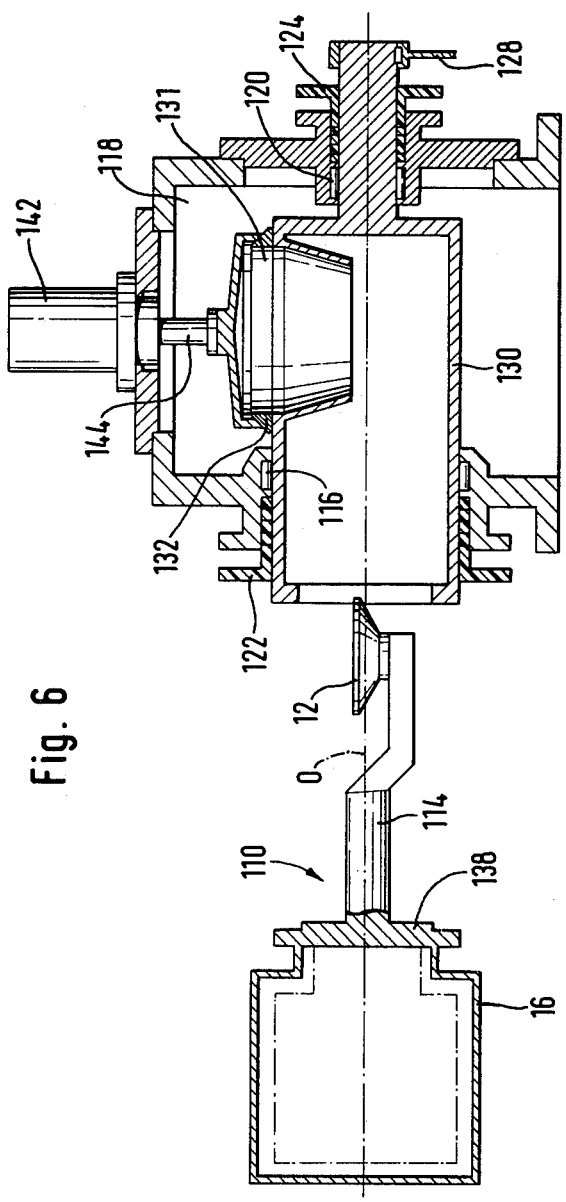
FIG. 6 depicts the apparatus of FIG. 4 with the probe dismantled.

To summarize operation of the embodiment of FIGS. 4–6, during the charge surface profile measuring mode the member 130 will be in the position shown in FIGS. 4 and 5 and will be oscillated about axis O by means of imparting motion to connecting rod 128. As soon as the scanning has been completed, the member 130 will be rotated about axis O so as to bring the aperture 131 into registration with the cover 140. The actuator 142 will then be operated to press cover 140 hermetically against the seat 132 as indicated in FIG. 6.

With the apparatus in the condition depicted in FIG. 6 the antenna 12 may be removed from the interior of the furnace by dismantling the profilometer which has been indicated generally at 110 in FIGS. 4 and 6. This dismantling is accomplished by releasing the means which secures flange 138 to the member 130.

As the apparatus is depicted in the embodiment of FIGS. 4–6, member 130 is rotated 180° in moving from the operative position of FIG. 4 to antenna isolation position of FIG. 6. It is, of course, possible to construct the apparatus such that a rotation of only 90°, by way of example, will be adequate to bring the aperture 131 into alignment with the cover member 140.

Figure 7:
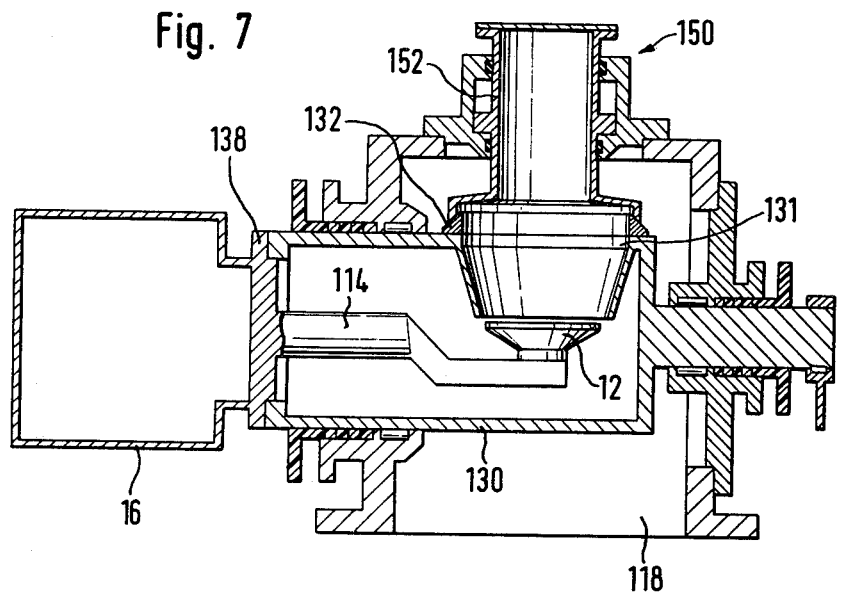
FIG. 7 is a schematic side elevation view, partly in section, of a further embodiment of the present invention.

A further embodiment of the present invention, which constitutes a modification of the embodiment of FIGS. 4–6, is depicted in FIG. 7. In FIG. 7 the piston 152 of the actuator 150 performs the function of the cover 140 of the FIGS. 4–6 embodiment. The embodiment of FIG. 7 offers the advantage of affording access to the antenna 12 via the hollow piston 152, particularly for the purpose of cleaning the antenna either with suitable tools or with a pressurized jet of fluid. It is also possible to inspect antenna 12 through the tubular piston 152. The embodiment of FIG. 7 is otherwise the same as and functions in the same manner as the embodiment of FIGS. 4-6.

The use of a rotary member to define the chamber in which the antenna will be located when hermetically isolated from the furnace interior, as shown in the embodiments of FIGS. 4-7, offers certain advantages when compared to the use of a reciprocating chamber defining member as shown in FIGS. 1-3. The rotary member occupies less space. Additionally, the housing for the electronics can be mounted such that it may be removed with the antenna but without the necessity of also removing a mounting block such as block 20 of FIG. 1.

Figure 8:
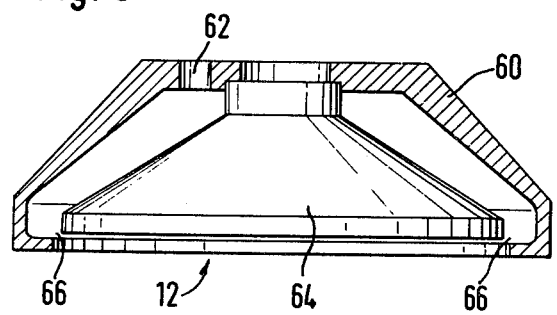
FIG. 8 is a schematic diagram of an antenna which may be employed with the probes of any of the disclosed embodiments of the present invention.

FIG. 8 shows a blower system which may be employed in any of the above-described embodiments of the present invention to assist in preventing the degradation of the performance of the apparatus through the formation of deposits on antenna 12. As shown in FIG. 8, the parabolic reflector 64 of antenna 12 is surrounded by a generally cone-shape member 60. The space between reflector 64 and member 60 defines a passage for the flow of gases which are delivered thereto, via an orifice 62, from a source of pressurized gas. The gas source may be a supply of nitrogen or purified blast furnace gas. The edge of the member 60 cooperates with that of reflector 64 to define a peripheral nozzle 66. The gas exiting nozzle 66 will flow over the exposed surface of reflector 64. Employment of a blower system of the type depicted in FIG. 8 can remove dust deposits from the surface of reflector 64 and, additionally, a region of turbulence can be established immediately in front of the reflector to thereby reduce the possibility of dust particles reaching and thus settling on the reflector. The gas delivered to the blower device of FIG. 8 can be conducted to orifice 62 by means of a conduit which passes through shaft 14 or shaft 114.

While preferred embodiments have been shown and described, various modifications and substitutions may be made thereto without departing from the spirit and scope of the present invention. By way of example, while the present invention has been described in relation to a probe wherein a single antenna is employed for the transmission and reception of radio frequency energy, other types of radiation may be employed and separate antennas for transmission and reception of energy can be utilized. It will also be understood that the electronics in housing 16 may or may not include circuitry for processing signals commensurate with the received reflections. Accordingly, it will be understood that the present invention has been described by way of illustration and not limitation.

What is claimed is:

1. In apparatus for measuring the contour of a surface from a location remote from the surface, the improvement comprising:
    means for transmitting radiant energy to the surface of interest and receiving the transmitted energy reflected from the surface;
    support means for said transmitting and receiving means; and
    chamber defining means movable relative to said support means between a first position commensurate with measurement of the surface and a second position wherein the transmitting and receiving means is hermetically isolated from the surface within a chamber.

2. The apparatus of claim 1 wherein said transmitting and receiving means is mounted for rotation about an axis and wherein said chamber defining means is at least in part also movable relative to the transmitting and receiving means.

3. The apparatus of claim 2 wherein said chamber defining means is longitudinally movable, said chamber defining means being in the form of a gas tight enclosure open at a first end, said first end of said enclosure cooperating with said support means to form a hermetic enclosure about said transmitting and receiving means.

4. The apparatus of claim 2 wherein said chamber defining means includes a first element in the form of a rotatable gas tight enclosure having an opening through which the energy is transmitted and received, said chamber defining means further including a second element movable relative to said first element to cover the opening in said first element whereby a hermetic enclosure is formed about said transmitting and receiving means.

5. The apparatus of claim 2 wherein the surface to be measured is the charge on the hearth of a furnace and wherein said support means comprises:
    means cooperating with the furnace wall to form a housing for said transmitting and receiving means, said housing having an opening therein which communicates with the interior of the furnace, the energy emitted and received by said transmitting and receiving means passing through said housing opening.

6. The apparatus of claim 5 wherein said chamber defining means is longitudinally movable within said housing, said chamber defining means being in the form of a gas tight enclosure open at a first end, said open first end of said enclosure cooperating with a wall of said housing means to form a hermetic enclosure about said transmitting and receiving means within said housing.

7. The apparatus of claim 5 wherein said chamber defining means is mounted within said housing, said chamber defining means including a first element in the form of a gas tight enclosure having an opening through which the energy from said transmitting and receiving means may pass, said first element being rotatable, said chamber defining means further including a second element longitudinally movable with respect to said first element, said second element being in the form of a cover which cooperates with said first element to hermetically seal the opening therein whereby a hermetic enclosure surrounding said transmitting and receiving means is established within said housing.

8. The apparatus of claim 2 wherein said transmitting and receiving means comprises:
    antenna means, said antenna means being located at a first side of said support means;
    signal generator means, said signal generator means being positioned at a second side of said support means; and
    rigid signal conducting means coupling said signal generating means to said antenna means, said signal coupling means passing through said support means, said signal generating means, antenna means and signal transmitting means rotating as a unit to scan the energy emitted from said antenna means across the surface of interest.

9. The apparatus of claim 8 wherein said chamber defining means is longitudinally movable, said chamber defining means being in the form of a gas tight enclosure open at a first end, said first end of said enclosure cooperating with said support means to form a hermetic enclosure about said transmitting and receiving means.

10. The apparatus of claim 8 wherein said chamber defining means includes a first element in the form of a rotatable gas tight enclosure having an opening through which the energy is transmitted and received, said chamber defining means further including a second element movable relative to said first element to cover the opening in said first element whereby a hermetic enclosure is formed about said transmitting and receiving means.

11. The apparatus of claim 8 wherein the surface to be measured is the charge on the hearth of a furnace and wherein said support means comprises:
means cooperating with the furnace wall to form a housing for said transmitting and receiving means, said housing having an opening therein which communicates with the interior of the furnace, the energy emitted and received by said transmitting and receiving means passing through said housing opening.

12. The apparatus of claim 11 wherein said chamber defining means is longitudinally movable within said housing, said chamber defining means being in the form of a gas tight enclosure open at a first end, said open first end of said enclosure cooperating with a wall of said housing means to form a hermetic enclosure about said transmitting and receiving means within said housing.

13. The apparatus of claim 11 wherein said chamber defining means is mounted within said housing, said chamber defining means including a first element in the form of a gas tight enclosure having an opening through which the energy from said transmitting and receiving means may pass, said first element being rotatable, said chamber defining means further including a second element longitudinally movable with respect to said first element, said second element being in the form of a cover which cooperates with said first element to hermetically seal the opening therein whereby a hermetic enclosure surrounding said transmitting and receiving means is established within said housing.

14. The apparatus of claim 12 wherein said chamber defining means further comprises:
fluidic actuator means, said actuator means being positioned to the exterior of said housing means and including a movable output member which extends through a wall of said housing means, said output member being connected to said gas tight enclosure.

15. The apparatus of claim 14 wherein said gas tight enclosure is integral with said actuator output member.

16. The apparatus of claim 14 wherein said housing includes:
mounting block means, said mounting block means being affixed to an exterior wall of said housing means, said signal conducting means extending through said mounting block means and being supported for rotation therein, said mounting block means covering an aperture in said housing means wall; and
seal means mounted on the internal wall of said housing means about the periphery of the aperture covered by said mounting block means, said seal means cooperating with said enclosure open end to define a hermetic seal.

17. The apparatus of claim 13 wherein said chamber defining means first element is rotatable with said antenna and wherein said chamber defining means further includes:
fluidic actuator means, said fluidic actuator means being positioned to the exterior of said housing and including an output member which extends through a wall of said housing, said actuator means output member being connected to said chamber defining means second element to impart reciprocal motion thereto whereby said second element may be urged into sealing relationship with the periphery of the opening in said first element when said first element is rotated to face said second element.

18. The apparatus of claim 17 wherein said chamber defining means first element extends through a second opening in the wall of said housing and wherein said chamber defining means further comprises:
removable flange means, said flange means covering a second opening in said chamber defining means first element, said second opening in said first element being located to the exterior of said housing, said signal conducting means passing through said flange means whereby said signal generator means and said antenna means are located at opposite sides of said flange means, said antenna means being removable from said housing by removing said flange means.

19. The apparatus of claim 18 wherein scanning motion is transmitted to said antenna means by causing said housing defining means first member to oscillate, oscillation of said housing defining means being coupled via said flange means and signal transmitting means to said antenna means.

20. The apparatus of claim 1 further comprising:
means for establishing a flow of gas in front of said transmitting and receiving means.

21. The apparatus of claim 8 wherein said antenna means comprises:
a reflector; and
nozzle means located about the periphery of said reflector, said nozzle means discharging gas across the face of said reflector.

22. The apparatus of claim 14 wherein said antenna means comprises:
a reflector; and
nozzle means located about the periphery of said reflector, said nozzle means discharging gas across the face of said reflector.

23. The apparatus of claim 17 wherein said antenna means comprises:
a reflector; and
nozzle means located about the periphery of said reflector, said nozzle means discharging gas across the face of said reflector.

* * * * *